US010984015B2

(12) United States Patent
Stockert et al.

(10) Patent No.: US 10,984,015 B2
(45) Date of Patent: Apr. 20, 2021

(54) MULTI-SELECT DROPDOWN STATE REPLICATION

(71) Applicant: Citrix Systems, Inc., Fort Lauderdale, FL (US)

(72) Inventors: Trevor Stockert, Fort Lauderdale, FL (US); Lee Hosford, Fort Lauderdale, FL (US); Scott Israel, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 579 days.

(21) Appl. No.: 15/790,382

(22) Filed: Oct. 23, 2017

(65) Prior Publication Data

US 2019/0121900 A1    Apr. 25, 2019

(51) Int. Cl.
*G06F 16/27*   (2019.01)
*G06F 16/248*   (2019.01)
*G06F 16/2457*   (2019.01)
*G06F 16/242*   (2019.01)
*G06F 3/0482*   (2013.01)

(52) U.S. Cl.
CPC ............ *G06F 16/27* (2019.01); *G06F 16/248* (2019.01); *G06F 16/2423* (2019.01); *G06F 16/2425* (2019.01); *G06F 16/2457* (2019.01); *G06F 3/0482* (2013.01)

(58) Field of Classification Search
CPC .. G06F 16/27; G06F 16/2425; G06F 16/2423; G06F 16/2457; G06F 16/248; G06F 3/0482; G06F 17/30286; G06F 17/30575; G06F 3/0601; G06F 11/1451; H04L 29/0854
See application file for complete search history.

(56) References Cited

U.S. PATENT DOCUMENTS

| | | | | |
|---|---|---|---|---|
| 2002/0147709 | A1* | 10/2002 | Rajarajan | ................ G06F 9/451 |
| 2006/0195575 | A1* | 8/2006 | Delany | ............... G06F 21/6218 709/225 |
| 2012/0036552 | A1* | 2/2012 | Dare | ................... H04L 41/0253 726/1 |
| 2014/0156702 | A1* | 6/2014 | Shyamsunder | ....... G06F 16/954 707/769 |

* cited by examiner

*Primary Examiner* — Ashish Thomas
*Assistant Examiner* — Suman Rajaputra
(74) *Attorney, Agent, or Firm* — Banner & Witcoff, Ltd.

(57) ABSTRACT

Aspects described herein are directed to the live updating of user interface elements through multi-select state replication. A resource management server may receive domain and search query information from a user computing device and may execute a database request based on the search query. The results of the search query may be generated by the resource management server in a dropdown user interface element. Through the dropdown element, the resource management server may receive one or more selections of the results of the search query generated in the dropdown element. Based on the one or more selections, the resource management server may add entities corresponding to the one or more selections to the domain and update the dropdown user interface element.

14 Claims, 19 Drawing Sheets

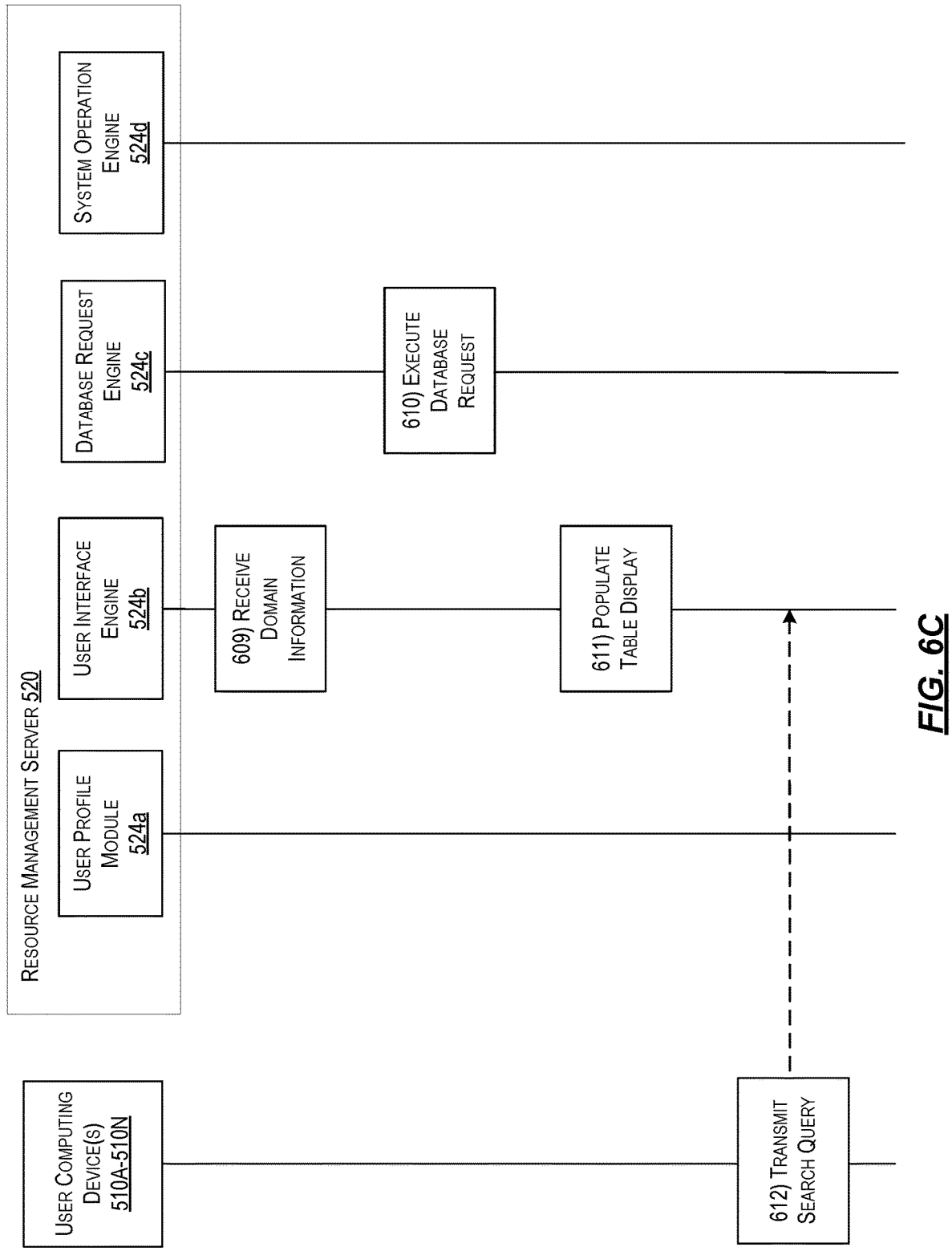

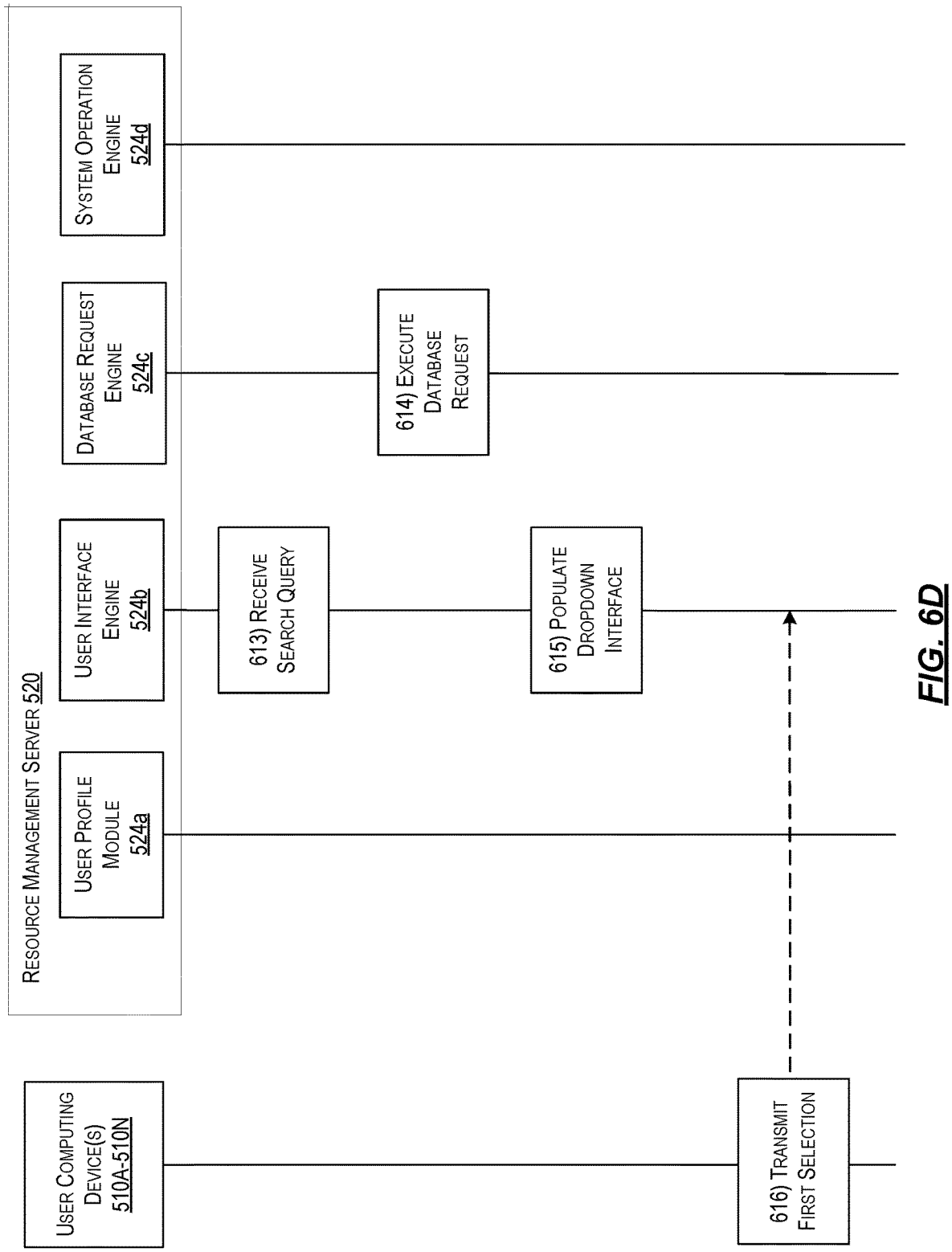

US 10,984,015 B2

MULTI-SELECT DROPDOWN STATE REPLICATION

FIELD

Aspects described herein generally relate to apparatuses, systems, and methods for generating dynamic user interface elements. In particular, one or more aspects of the disclosure relate to live updating user interface elements through multi-select state replication.

BACKGROUND

User interface elements enable users to perceive and interact with both front-end and back-end computing systems. In some instances, such elements, similar to those described herein, can provide technological benefits such as improving computing efficiency, reducing energy usage in performing computational processes associated with the user interface elements, and minimizing bandwidth consumption resulting from interactions with the user interface elements by streamlining the entry, presentation, and flow of data.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations that will be apparent upon reading and understanding the present specification, aspects described herein are directed towards apparatuses, systems, and methods for performing multi-select dropdown state replication.

In accordance with one or more embodiments, a first computing device may receive, from a second computing device, through a user interface associated with the first computing device, a domain and search query. The first computing device may execute a first database request based on the search query. The first computing device may generate a dropdown interface in the user interface, the dropdown interface containing one or more results of the search query. The first computing device may receive, from the second computing device, a first selection of one of the one or more results of the search query. The first computing device may add, to the domain, a first entity associated with the first selection of the one of the one or more results of the search query. The first computing device may update the dropdown interface of the user interface containing the one or more results of the search query with an indication of the adding of the first entity.

In some embodiments, the first computing device may receive, from the second computing device, a second selection of one of the one or more results of the search query. The first computing device may add, to the domain, a second entity associated with the second selection of the one of the one or more results of the search query. The first computing device may update the dropdown interface of the user interface containing the one or more results of the search query with an indication of the adding of the second entity.

In some embodiments, the user interface may include a data table of previously added entities to the domain, and the first computing device may update the data table of previously added entities with the first entity associated with the first selection.

In some embodiments, the updating the data table by the first computing device may include generating, by the first computing device, a status of the adding of the first entity, wherein the status is one of failed, pending, or added.

In some embodiments, the adding of the first entity to the domain by the first computing device may further include, executing, by the first computing device, and responsive to receiving the first selection, a second database request, wherein the second database request adds the first entity associated with the first selection of the one of the one or more results of the search query to the domain.

In some embodiments, the search query performed by the first computing device identifies one or more entities able to be added to the domain, and the being added to the domain enables the one or more entities to perform one or more functions associated with the domain.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 6A-6G depict an illustrative event sequence for performing multi-select dropdown state replication in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards performing multi-select dropdown state replication during a process in which one or more users are added, enrolled, and/or subscribed to one or more domains associated with permissions and/or subscription categories of a database. A system administrator may access a resource management server operating, and/or with access to, a database storing information related to one or more user permissions and/or subscription categories. The resource management server may provide the system administrator with a user interface to facilitate the adding of one or more users to one or more domains associated with permissions and/or subscription categories of the database. The user interface may include a multi-select dropdown state replication element which enables the system administrator to dynamically add the one or more users to the one or more domains associated with permissions and/or subscription categories of the database. In doing so, the multi-select dropdown state replication user interface element may provide technological benefits such as improving computing efficiency, reducing energy usage in performing computational processes associated with the adding of users to the one or more domains, and minimizing bandwidth consumption resulting from interactions during the adding of users to the one or more domains by streamlining the entry, presentation, and flow of data from a computing device associated with the system administrator to the resource management server.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
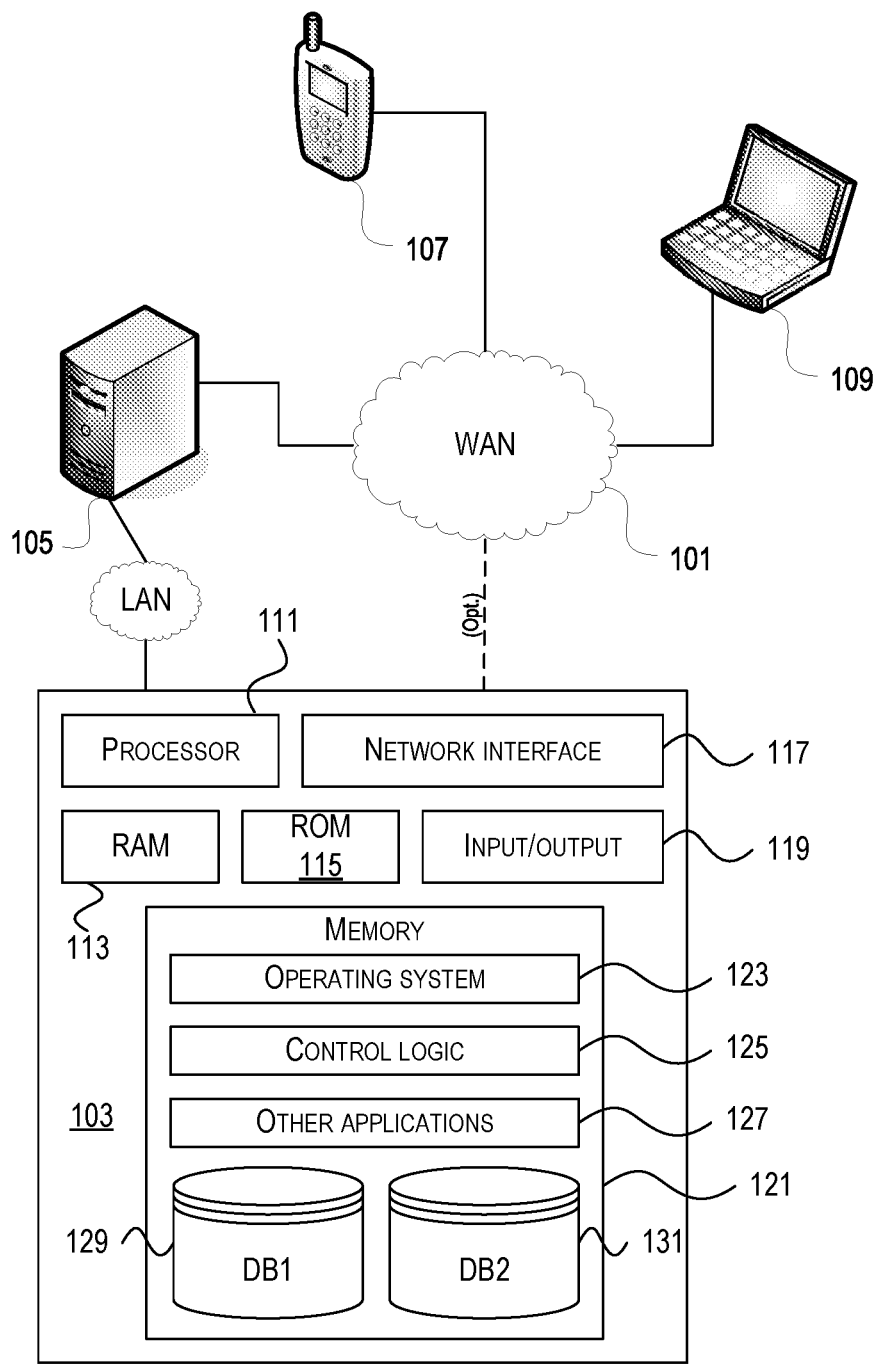
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
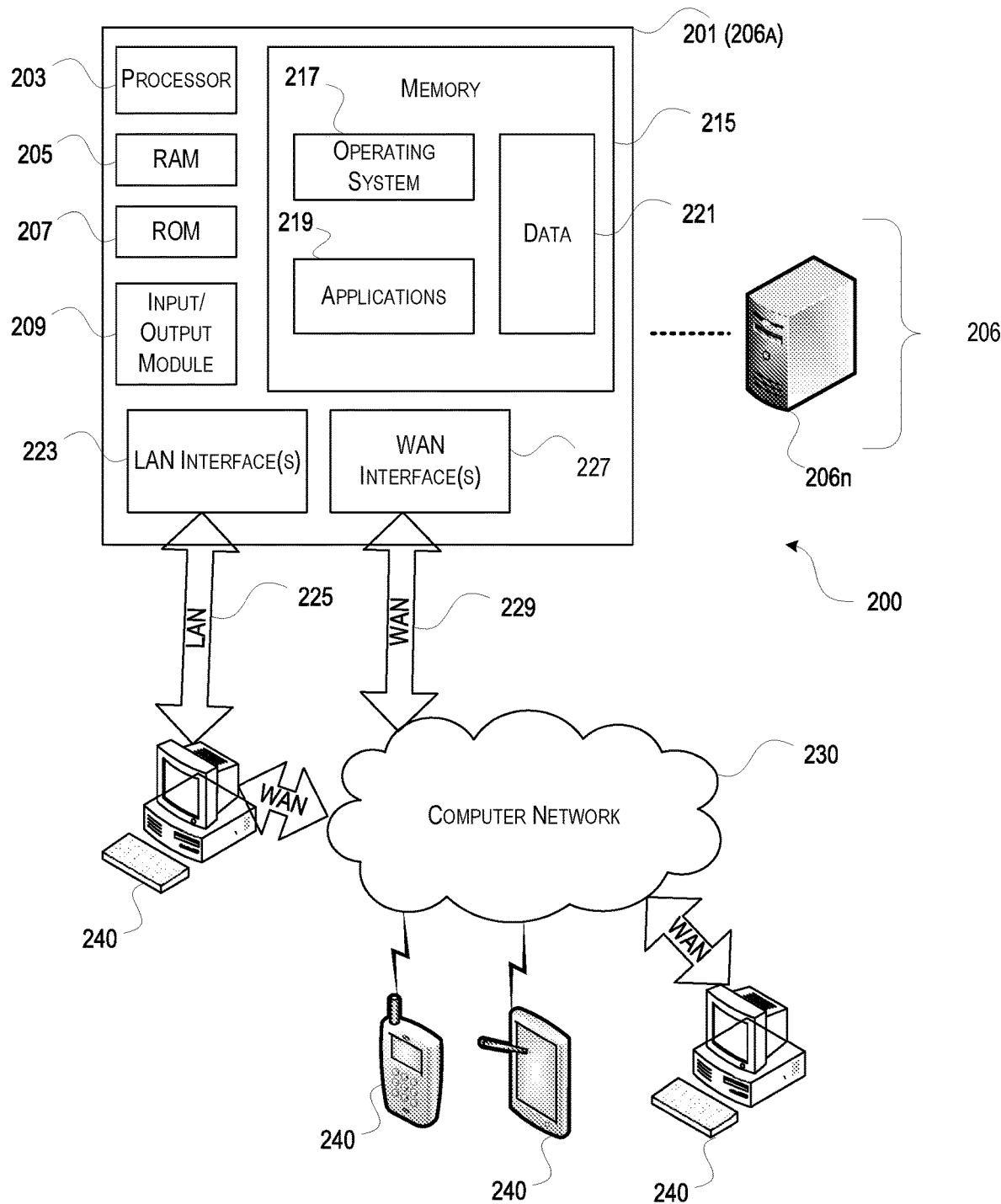
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s); local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
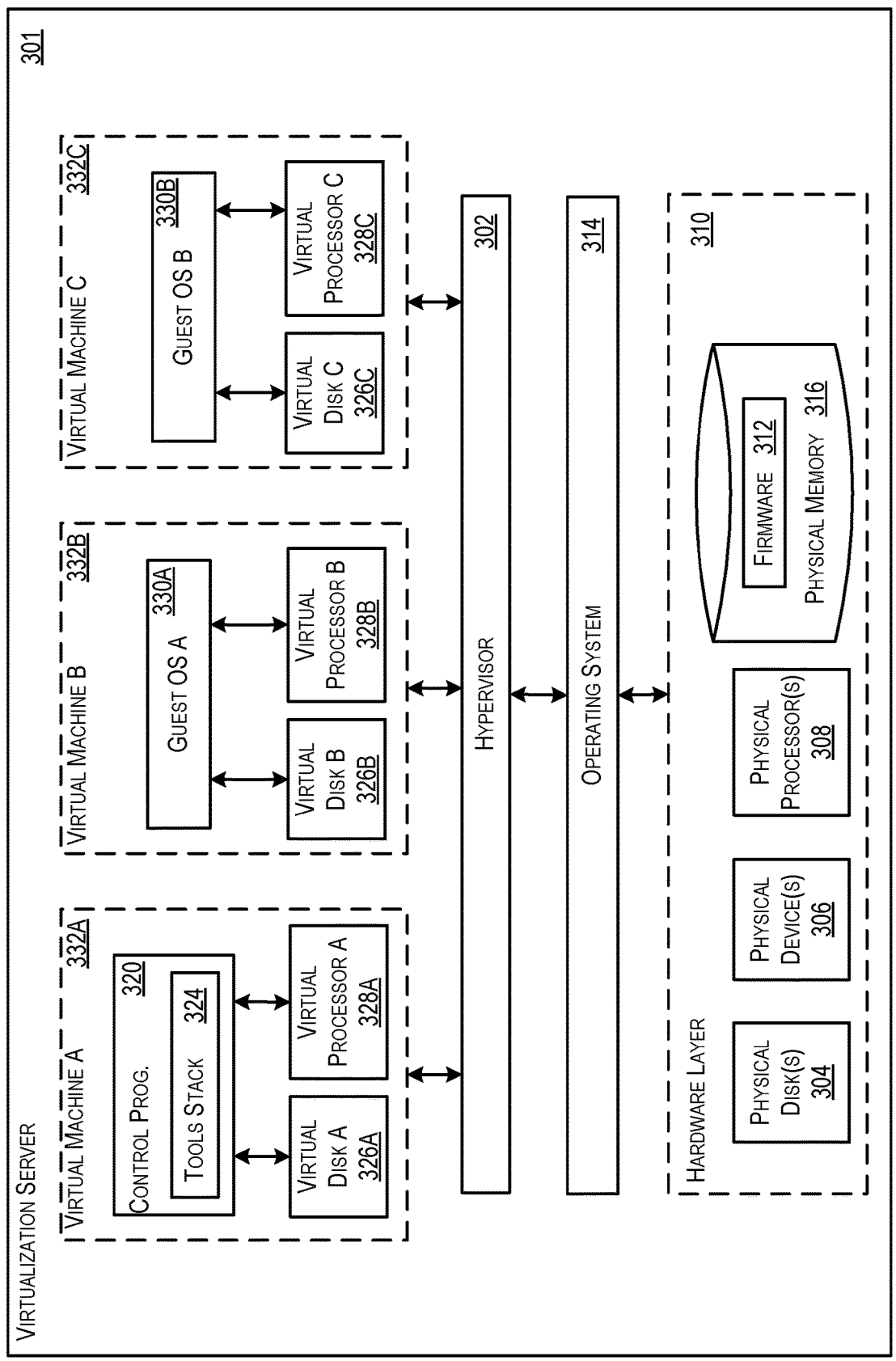
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
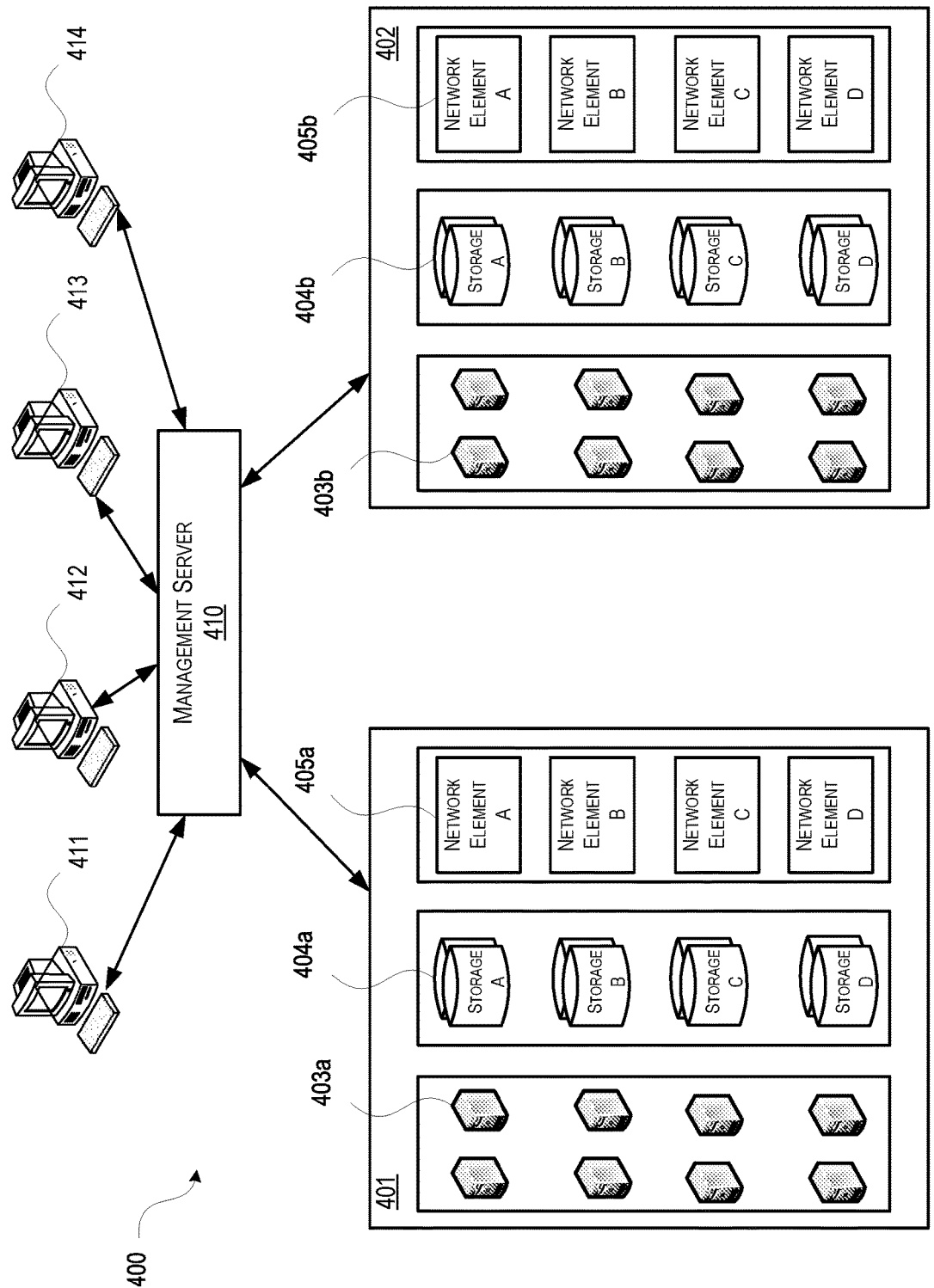
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Multi-Select Dropdown State Replication

Figure 5A:
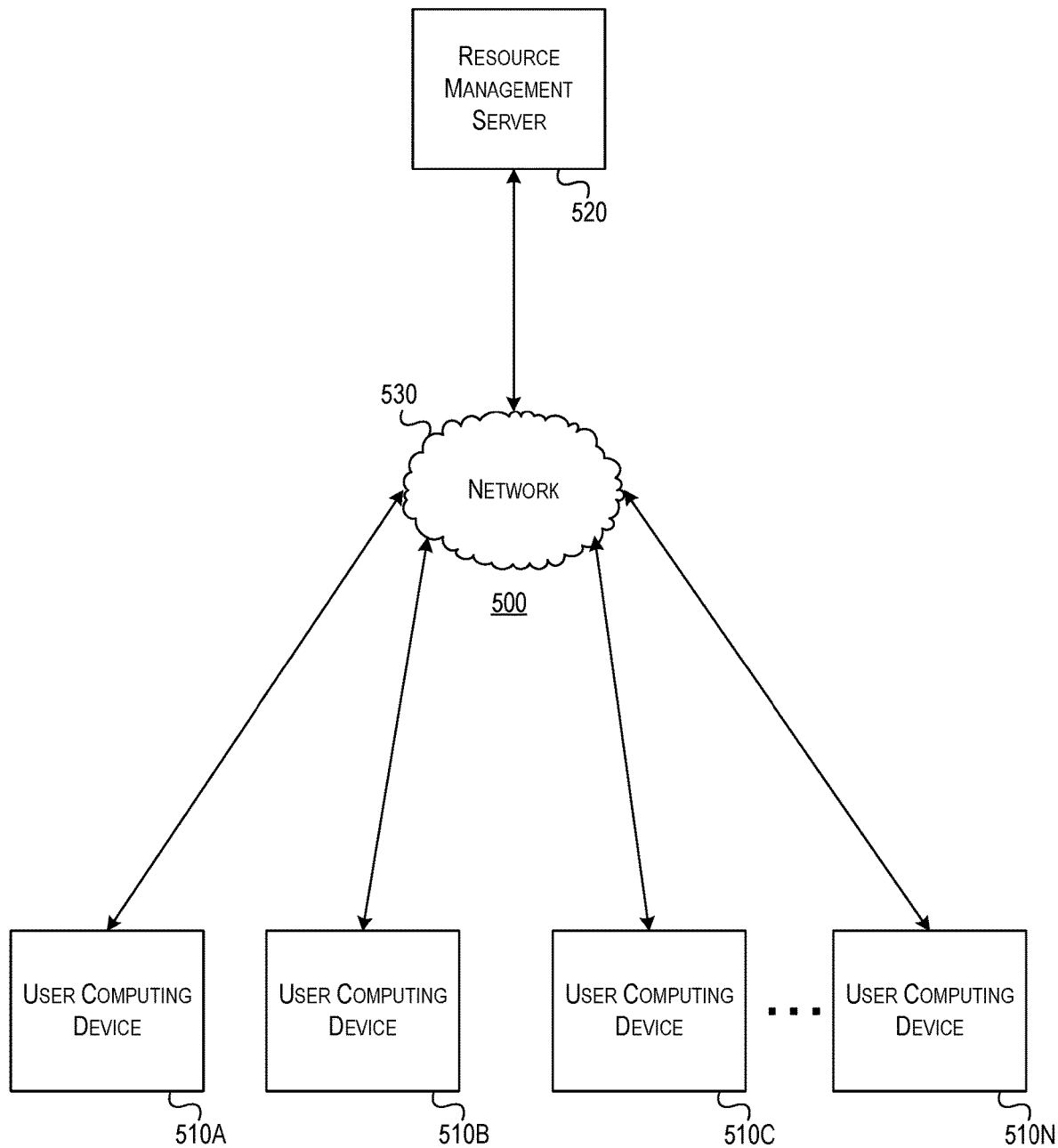
FIG. 5A depicts an illustrative diagram of a system for performing multi-select dropdown state replication in accordance with one or more illustrative aspects described herein.

FIG. 5A depicts an illustrative diagram of a computing system 500 for performing multi-select dropdown state replication in accordance with one or more illustrative aspects described herein. As shown in FIG. 5A, computing system 500 may at least include one or more user computing devices 510A-510N and resource management server 520, which may be configured to communicate with each other through computer network 530. In some instances, additional computing devices similar to user computing devices 510A-510N and resource management server 520 may be included in computing system 500. According to the embodiment depicted in FIG. 5A, one or more of user computing devices 510A-510N and resource management server 520 may participate in performing multi-select dropdown state replication in accordance with one or more illustrative aspects described herein.

User computing devices 510A-510N may be any one of a personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like, and may include any of the above systems or devices described in FIGS. 1-4. Each of the user computing devices 510A-510N may be configured to interact with resource management server 520 by way of communications through network 530. In particular, each of the user computing devices 510A-510N may be configured to receive and transmit information in facilitating user enrollment with permissions and/or subscription categories of a database associated with resource management server 520, as will be described in further detail below, through a multi-select dropdown state replication user interface element. As such, user computing devices 510A-510N may include an input/output module such as a microphone, keypad, touch screen, and/or stylus through which a user of the may provide input, and may also include one or more of a speaker for providing audio input/output and a video display device for providing textual, audiovisual and/or graphical output, as well as one or more communication interfaces.

In order to communicate with resource management server 520, user computing devices 510A-510N may access one or more of an application and URL configured to provide a user interface and communicative portal through which a user and/or system administrator may interact with resource management server 520. Upon access, the user and/or system administrator of one of the user computing devices 510A-510N may be requested, by resource management server 520, to provide credentials such as a username and password.

Responsive to authentication by resource management server 520, the user and/or system administrator may proceed with enrollment in permissions and/or subscription categories corresponding to domains of the database associated with resource management server 520 through the multi-select dropdown state replication user interface element. In some instances, the enrollment may involve the user and/or system administrator, other users, and/or groups of users of user computing devices 510A-510N. As will be described in further detail below, the enrollment process may involve one or more interactions by the user and/or system administrator of one of user computing devices 510A-510N with resource management server 520 through the multi-select dropdown state replication user interface element.

After the user, system administrator, other users, and/or groups of users of one or more of user computing devices 510A-510N are enrolled in permissions and/or subscription categories of the database associated with resource management server 520, the user, system administrator, other users, and/or groups of users of one or more of user computing devices 510A-510N may have access to particular data and/or be able to perform particular functions based on the permissions and/or subscription categories of the domain of the database in which they are enrolled.

Referring back to FIG. 5A, computing system 500 may include resource management server 520, which may include a plurality of computing devices and associated computing hardware and software that may host various applications and/or databases configured to receive, transmit, and/or store data, control and/or direct actions of other devices and/or computer systems (e.g., user computing device 510A-510N), and/or perform other functions, as discussed in greater detail below. In some arrangements, resource management server 520 may include and/or be part of enterprise information technology infrastructure and may host a plurality of enterprise applications, enterprise databases, and/or other enterprise resources. Such applications may, for instance, be executed on one or more computing devices included in resource management server 520 using distributed computing technology and/or the like. In some instances, resource management server 520 may include a relatively large number of servers that may support operations of a particular enterprise or organization, such a cloud computing provider. In addition, and as discussed in greater detail below, resource management server 520 may be configured to communicate with user computing devices 510A-510N.

As discussed above, resource management server 520 may be configured to interface with an application operating on user computing devices 510A-510N and/or provide a URL through which user computing devices 510A-510N may access resource management server 520. Resource management server 520 may be configured to receive credentials of a user and/or system administrator of user computing devices 510A-510N and authenticate the received credentials to identify existing permissions and/or subscriptions domains associated with the user and/or system administrator. If the user and/or system administrator is authenticated and is associated with existing permissions domains which allow for adding and/or enrolling of the user, system administrator, other users, and/or groups of users in permissions and/or subscription categories of the database associated with resource management server 520, then resource management server 520 may allow the user and/or system administrator to access a user interface comprising a multi-select dropdown state replication user interface element.

Through the user interface, resource management server 520 may receive selection of a domain corresponding to the permissions and/or subscription categories of the database. The domain may be of a particular permission and/or subscription category to which the user, system administrator, other users, and/or groups of users may be added, enrolled, and/or subscribed. In some instances, users within the domain (e.g., previously added, enrolled, and/or subscribed to the domain) may have permissions and/or subscription categories which allow the users within the domain to perform specific functions and/or access certain databases and/or data related to resource management server 520. A selection of a particular domain may cause resource management server 520 to populate a display table within the user interface with the previously added, enrolled, and/or subscribed users of the domain. In some instances, resource management server 520 may receive selection of a plurality of domains. In such instances, resource management server 520 may populate the display table with users that were previously added to each of the plurality of selected domains.

Through the multi-select dropdown state replication user interface element of the user interface, resource management server 520 may receive a search query from the user and/or system administrator of one of user computing devices 510A-510N. In some instances, the search query may be a complete statement (e.g., complete word, combination of words, and the like) or an alphanumeric character. Resource management server 520 may perform a database request based on the search query to return results corresponding to the query. The results may be generated by resource management server 520 in a dropdown portion of the multi-select dropdown state replication user interface element. Resource management server 520 may receive one or more selections of one or more of the results of the search query through the dropdown interface. Resource management server 520 may dynamically add, enroll, and/or subscribe each of the one or more selected results of search query to the domain based on the selection of the results through the dropdown interface. In some instances, the adding, enrolling, and/or subscribing may be associated with a state of the action of the adding, enrolling, and/or subscribing. For example, states may correspond to whether the action of the adding, enrolling, and/or subscribing was completed, has failed, or is pending. Resource management server 520 may replicate the state of the adding, enrolling, and/or subscribing in one or more of the table display user interface element and multi-select dropdown state replication user interface element in correlation to the each of the one or more selected search results.

Returning to FIG. 5A, computing system 500 also may include one or more networks, which may interconnect one or more of the one or more user computing devices 510A-510N and resource management server 520. For example, computing system 500 may include network 530. Network 530 may include one or more sub-networks (e.g., local area networks (LANs), wide area networks (WANs), or the like).

Figure 5B:
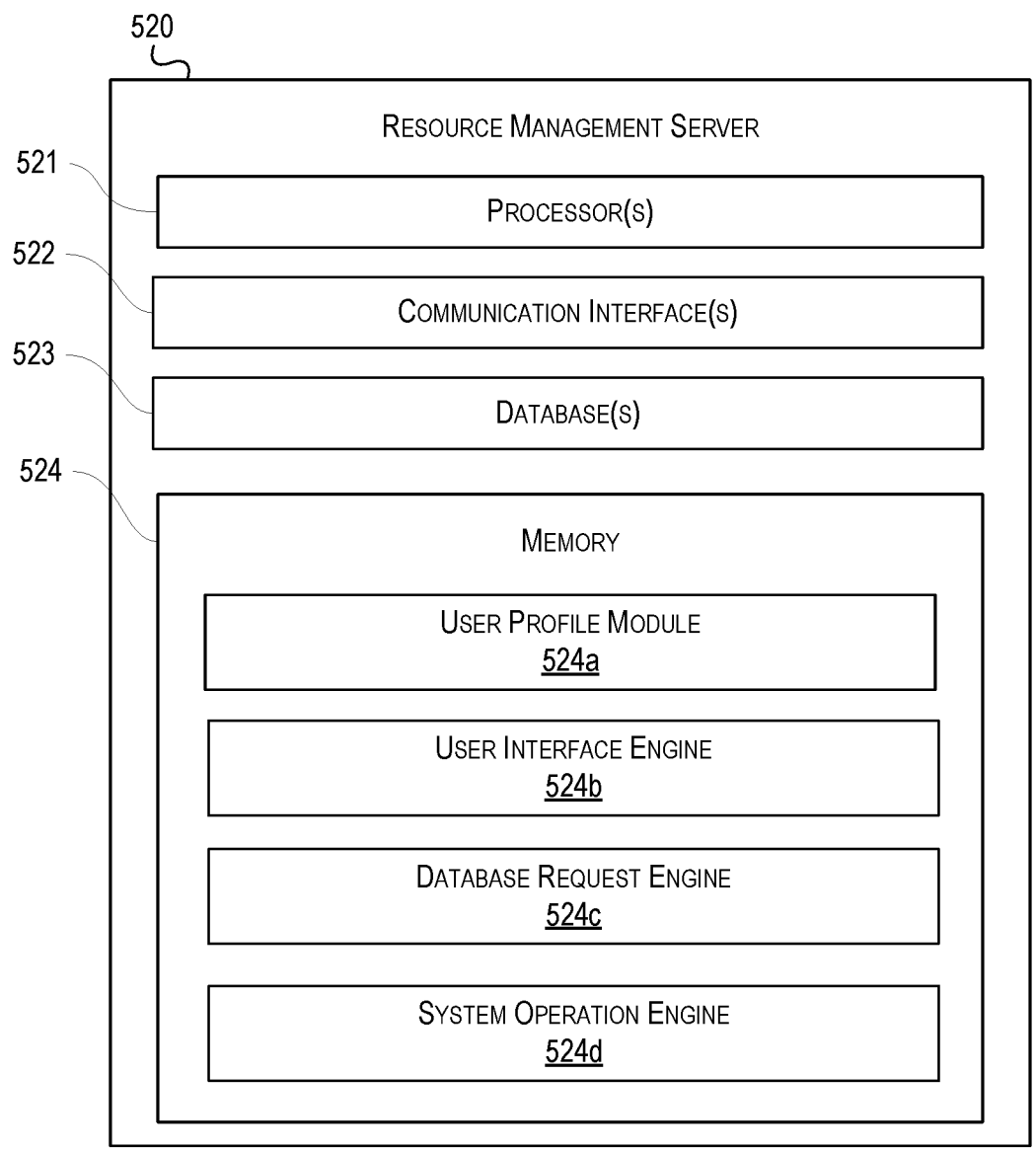
FIG. 5B depicts an illustrative diagram of a computing device for performing multi-select dropdown state replication in accordance with one or more illustrative aspects described herein.

FIG. 5B depicts an illustrative diagram of resource management server 520 for performing multi-select dropdown state replication in accordance with one or more illustrative aspects described herein. Resource management server 520 may include processor(s) 521, communication interface(s) 522, database(s) 523, and memory 524. Communication interface(s) 522 may include wired network adapters, wireless network adapters, and/or other networks interfaces configured to support communication between resource management server 520 and one or more networks (e.g., network 530). Database(s) 523 may store data related to each of a plurality of domains, including data related to previously added, enrolled, and/or subscribed users and/or entities of each of the plurality of domains. Memory 524 may include one or more program modules having instructions that, when executed by processor(s) 521, cause resource management server 520 to perform the multi-select dropdown state replication, as well as other functions described herein. For example, memory 524 may have, store, and/or include user profile module 524*a*, user interface engine 524*b*, database request engine 524*c*, and system operation engine 524*d*. In some instances, memory 524 may further serve as a shared memory which may be mutually and/or commonly accessible by each of include user profile module 524*a*, user interface engine 524*b*, database request engine 524*c*, and system operation engine 524*d* in performing the functions as described herein.

User profile module 524*a* may store information corresponding to a user and/or system administrator of one or more of the user computing devices 510A-510N as pertaining the usage of resource management server 520. In particular, user profile module 524*a* may store data corresponding to the user's credentials (e.g., username and password) and preferences in regard to the manner in which user interface engine 524*b*, database request engine 524*c*, and system operation engine 524*d* perform their respective functions.

User interface engine 524*b* may have instructions that facilitate many of the interactions between resource management server 520 and each of the one or more user computing devices 510A-510N as described herein. For instance, user interface engine 524*b* may enable resource management server 520 to receive domain information corresponding to one or more domains, as well as search request information from one or more of the user computing devices 510A-510N. User interface engine 524*b* may store further instructions which cause resource management server 520 to update a user interface with the domain information and results of the search query by populating a display table with the previously added, enrolled, and/or subscribed users of the domain and generating a dropdown interface with the search results. Further, user interface engine 524*c* may store instructions which cause resource management server 520 to receive one or more selections of the search results through the dropdown interface and update state information regarding the adding, enrolling, and/or subscribing of the entities corresponding to the one or more selections with the one or more domains.

Database request engine 524*c* may store instructions which cause resource management server 520 to execute database requests of database(s) 523. In particular, database request engine 524*c* may cause resource management server 520 to search database(s) 523 based on the domain information provided by the user and/or system administrator through one or more of user computing devices 510A-510N and return results corresponding to the search. Further, database request engine 524*c* may store additional instructions which cause resource management server 520 to sort database(s) 523 based on the search query information to identify available entities to be added, enrolled, and/or subscribed to the domain.

System operation engine 524*d* may store instructions which cause resource management server 520 to perform one or more functions associated with a domain corresponding to the received domain information. For example, system operation engine 524*d* may cause resource management server 520 to enable one or more of user computing devices 510A-510N to access particular files, data, and/or applications, transmit messages to particular entities, access particular networks, and the like.

FIGS. 6A-6G depict an illustrative event sequence for performing multi-select dropdown state replication in accordance with one or more illustrative aspects described herein. The events may be performed in the order depicted and described, or in any other arrangement and/or sequence.

Figure 6A:
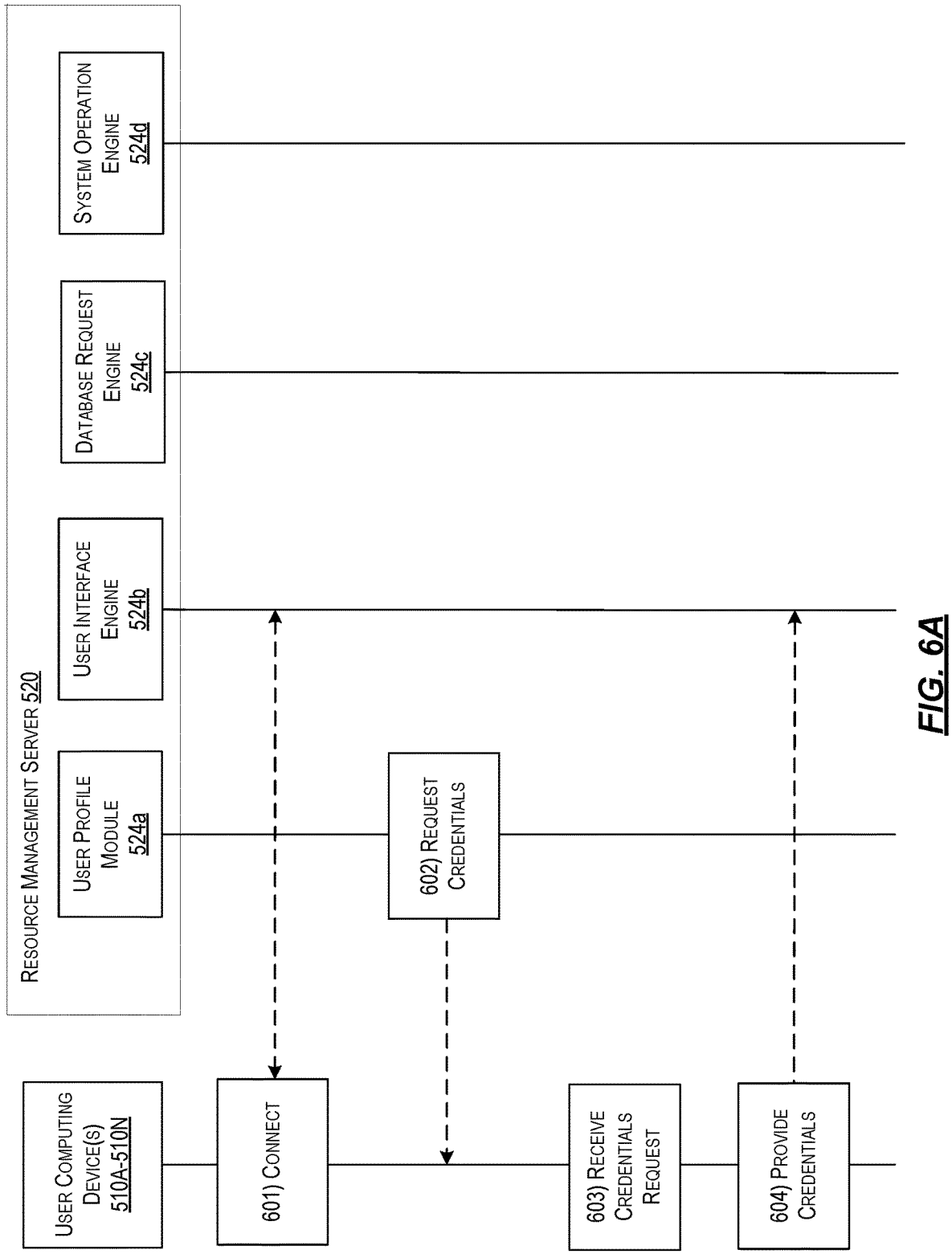

Referring to FIG. 6A, at step 601, a user and/or system administrator of one of user computing devices 510A-510N may connect with a URL associated with user interface engine 524*b* of resource management server 520. In some instances, a user and/or system administrator of one of user computing devices 510A-510N may activate a local application operating on the user computing device, which may connect with user interface engine 524*b* of resource management server 520. At step 602, user profile module 524*a* of resource management server 520 may request credentials from the user and/or system administrator of one of user computing devices 510A-510N. The requested credentials may include one or more of an email, username, password, and two-factor authentication key. At step 603, the user and/or system administrator may receive the request for credentials at one of user computing devices 510A-510N. At step 604, the user and/or system administrator of one of user computing devices 510A-510N may provide the requested credentials including one or more of an email, username, password, and two-factor authentication key to user interface engine 524*b* of resource management server 520. In some instances, the user and/or system administrator of one of user computing devices 510A-510N may provide the requested credentials directly to user profile module 524*a*.

Figure 6B:
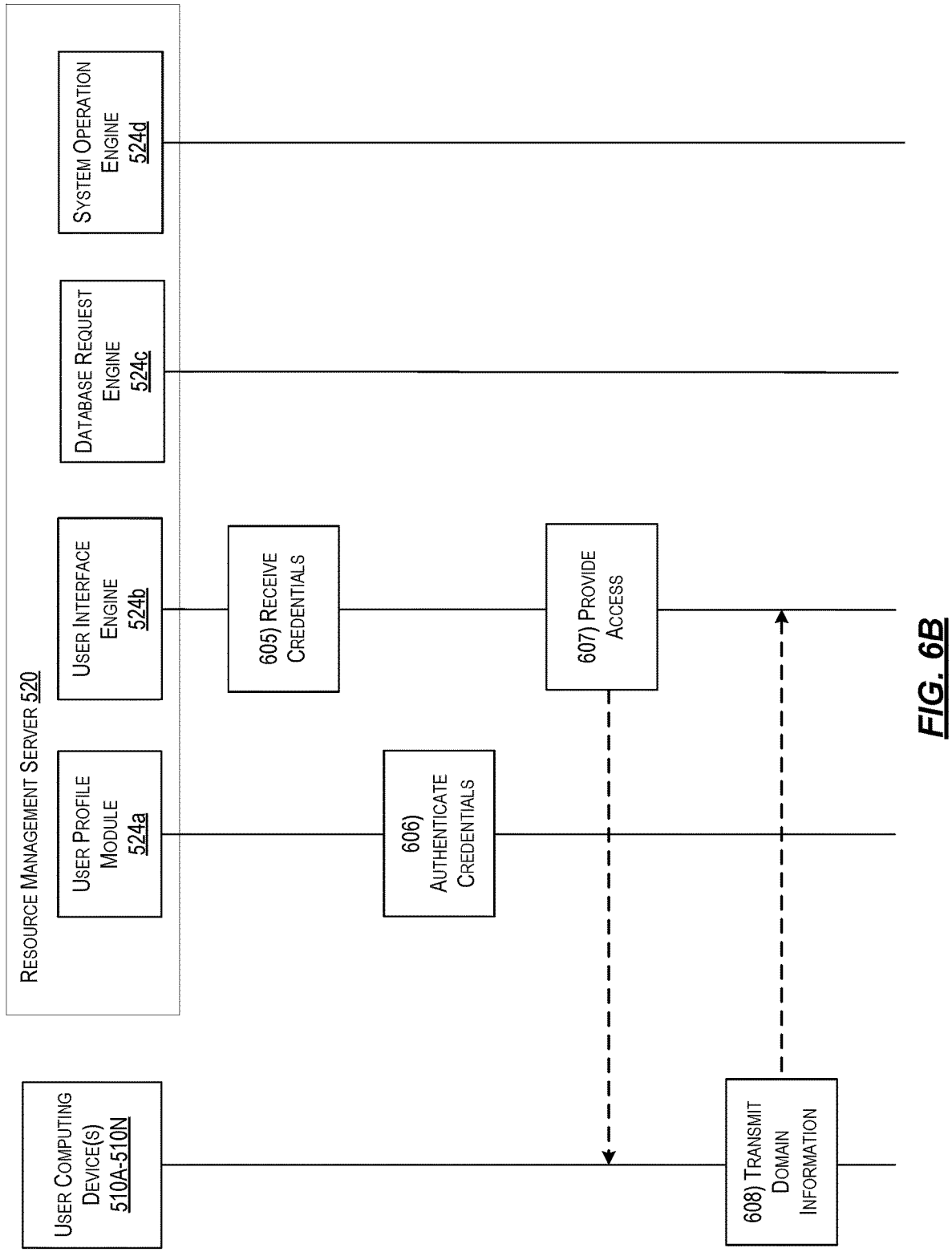

Referring to FIG. 6B, at step 605, user interface engine 524*b* of resource management server 520 may receive the credentials of the user and/or system administrator from the one of user computing devices 510A-510N. At step 606, user profile module 524*a* of resource management server 520 may authenticate the credentials of the user and/or system administrator. In doing so, user profile module 524*a* may compare the received credentials of the user and/or system administrator to previously authenticated credentials of the user and/or system administrator saved in memory 524. At step 607, user interface engine 524*b* of resource management server 520 may provide the computing device of the user computing devices 510A-510N of the user and/or system administrator access to a user interface comprising at least a multi-select dropdown state replication user interface element.

Figure 8A:
FIG. 8A-8E depict an illustrative rendering of the performance of multi-select dropdown state replication in accordance with one or more illustrative aspects described herein.

For example, in reference to FIG. 8A, user interface 800 may include domain information selection user interface element 810, multi-select dropdown state replication user interface element 820, and display table user interface element 830. As will be described in further detail below, a user and/or system administrator may use domain information selection user interface element 810 to select one or more domains related to user permissions and/or subscription categories, multi-select dropdown state replication user interface element 820 to generate a search query of users and/or groups (e.g., entities) and add users and/or groups identified in the search query to the one or more selected domains, and display table user interface element 830 to identify users and/or groups previously added to the one or more selected domains.

Referring back to FIG. 6B, at step 608, a user and/or system administrator of one of user computing devices 510A-510N may select domain information through domain information selection user interface element 810 of user interface 800. In some instances, the user and/or system administrator of one of user computing devices 510A-510N may select a plurality of items domain information through domain information selection user interface element 810.

In reference to FIG. 6C, at step 609, user interface engine 524*b* may receive the domain information from the computing device of user computing devices 510A-510N of the user and/or system administrator. In instances in which the user and/or system administrator of one of user computing devices 510A-510N selects a plurality of items domain information through domain information selection user interface element 810, user interface engine 524*b* may receive each of the plurality of items of domain information. At step 610, database request engine 524*c* may execute a database request of one or more of database(s) 523 based on the domain information received at step 609.

In instances in which the user and/or system administrator of one of user computing devices 510A-510N selects a plurality of items domain information through domain information selection user interface element 810, database request engine 524*c* may execute a number of database requests of one or more of database(s) 523 based on the number of user-selected domain information. For example, if the user and/or system administrator of one of user computing devices 510A-510N selects a two of items domain information through domain information selection user interface element 810, database request engine 524*c* may execute two database requests of one or more of database(s) 523 based on the two items of user-selected domain information.

Figure 8B:
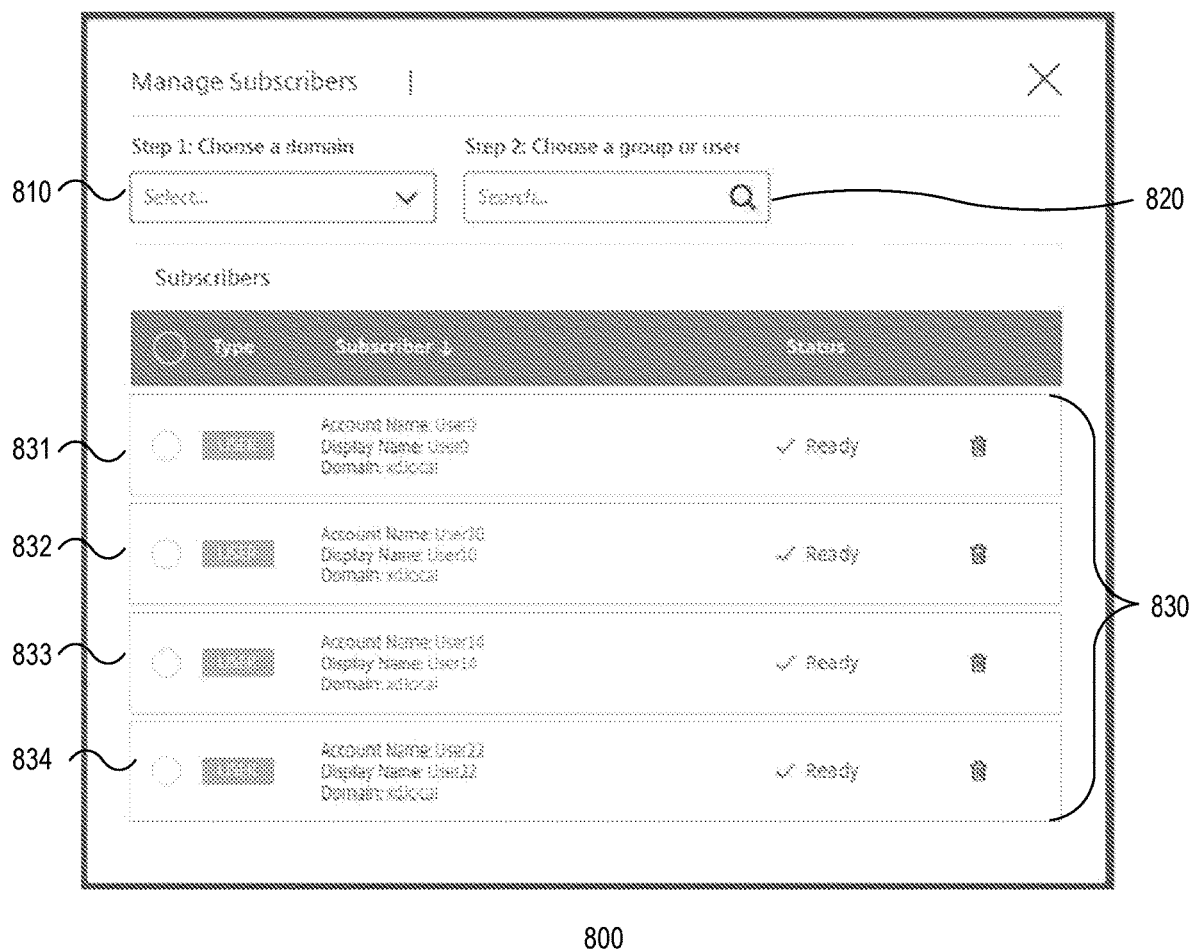

At step 611, user interface engine 524*b* of resource management server 520 may populate display table user interface element 830 of user interface 800 with results of the database request performed at step 610. For example, in reference to FIG. 8B, a user and/or system administrator may use domain information selection user interface element 810 of user interface 800 to select domain information, which may precipitate a domain request related to the domain information by database request engine 524*c* to identify entities associated with the domain information. The results of the domain request (e.g., entities 831, 832, 833, and 834) may be populated in display table user interface element 830 by user interface engine 524*b*.

In instances in which the user and/or system administrator of one of user computing devices 510A-510N selects a plurality of items of domain information through domain information selection user interface element 810, user interface engine 524*b* may populate display table user interface element 830 of user interface 800 with combined results of the database request performed at step 610 regarding each of the plurality of domains. For example, each entity resulting from a database request of a first selected domain would be populated, each entity resulting from a database request of a second selected domain would be populated, and so on. In some instances, the populated entities may only occupy each of the plurality of domains. For example, only entities that were yielded in database requests of both the first selected domain and the second selected domain would be populated.

At step 612, a user and/or system administrator of one of user computing devices 510A-510N may transmit a search query through multi-select dropdown state replication user interface element 820 of user interface 800. In some instances, the search query may be a single alphanumeric character, word, or plurality of words.

Referring to FIG. 6D, at step 613, user interface engine 524b of resource management server 520 may receive the search query the computing device of user computing devices 510A-510N of the user and/or system administrator. At step 614, database request engine 524c may execute a database request of one or more of database(s) 523 based on the search query. In some instances, the database request may sort the totality of users and/or groups stored in each of the one or more database(s) 523. Alternatively, the database request may sort the totality of users and/or groups with appropriate permissions relative to the one or more domains selected by the user and/or system administrator at step 608.

Figure 8C:
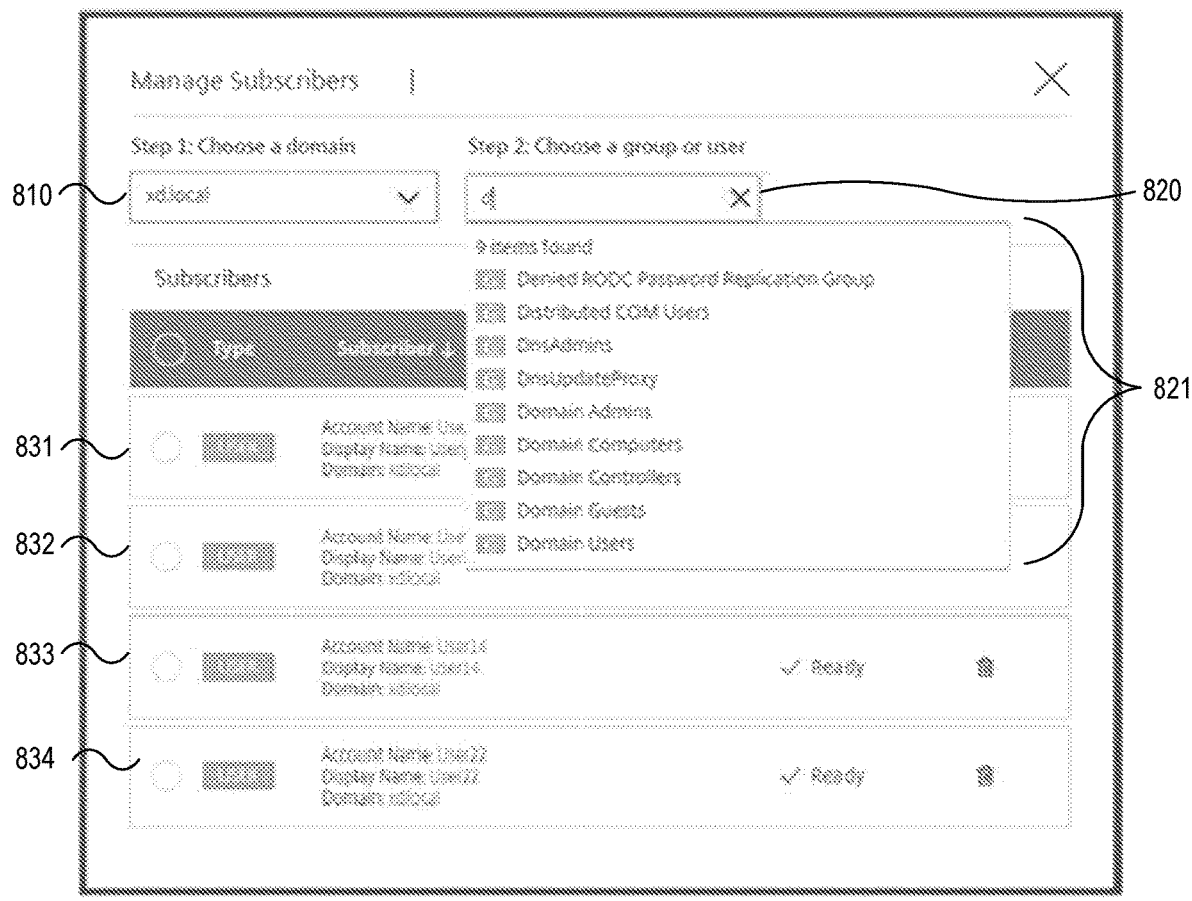

At step 615, user interface engine 524b of resource management server 520 may populate multi-select dropdown state replication user interface element 820 of user interface 800 with results of the database request performed at step 614. For example, in reference to FIG. 8C, a user and/or system administrator may use multi-select dropdown state replication user interface element 820 of user interface 800 to enter a search query, which may precipitate a domain request related to the search query by database request engine 524c to identify entities corresponding to the search query. The results of the domain request may be populated in dropdown interface element 821 by user interface engine 524b. Returning to FIG. 6D, at step 616, a user and/or system administrator of one of user computing devices 510A-510N may transmit a first selection of one of the results (e.g., entities) yielded during the database request performed at step 614 and populated in dropdown interface element 821 at step 615.

Figure 6E:
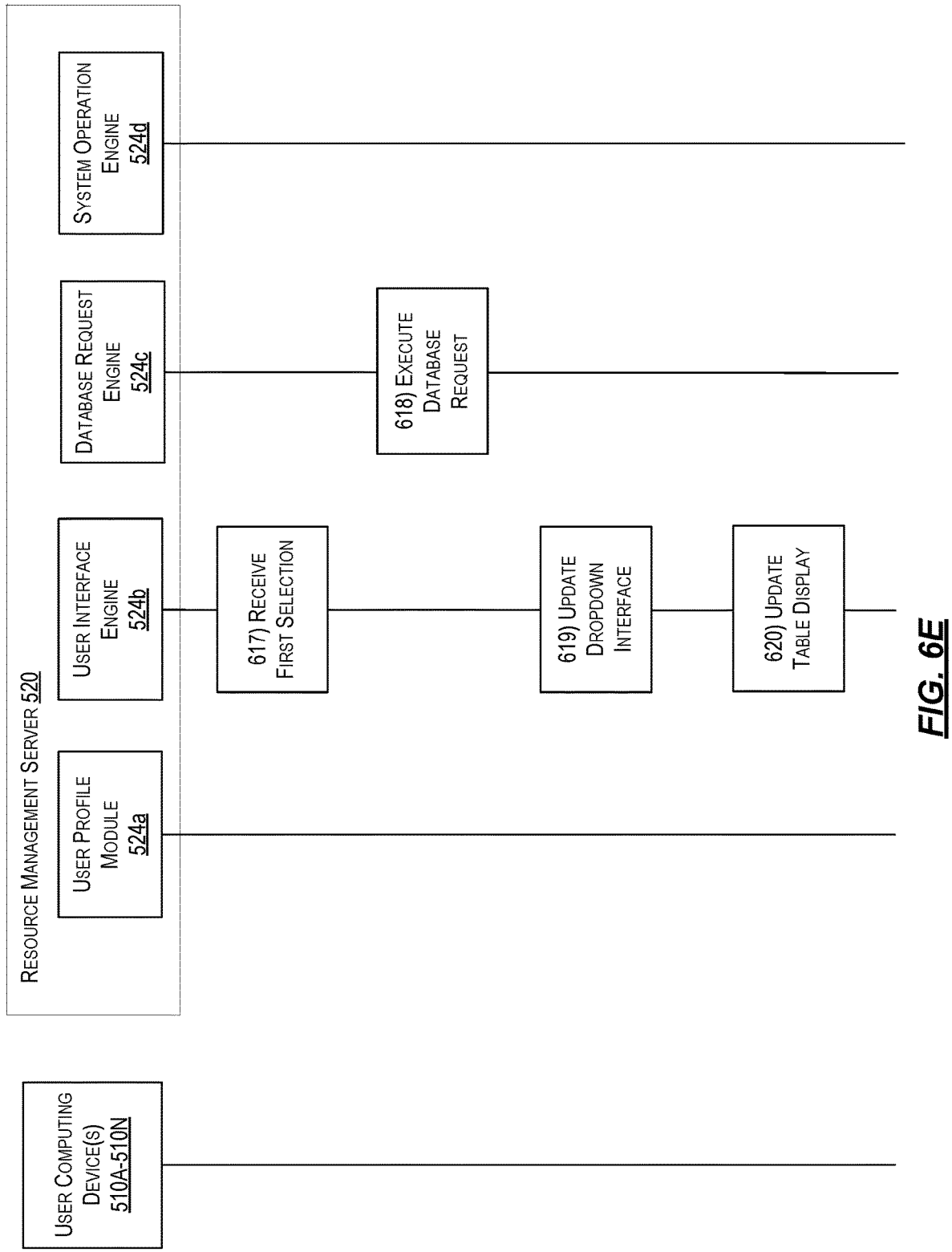

Referring to FIG. 6E, at step 617, user interface engine 524b of resource management server 520 may receive the first selection, by the user and/or system administrator and from the computing device of user computing devices 510A-510Na, of one of the results yielded during the database request. At step 618, database request engine 524c may add, enroll, and/or subscribe the entity corresponding to the first selection to each of the one or more domains selected by the user at step 608. As stated above, the entity corresponding may be a user or a group of users. In some instances, the adding, enrolling, and/or subscribing of the first entity to each of the one or more domains may include executing a database request, by database request engine 523c, of one or more of the database(s) 523. Further, the adding, enrolling, and/or subscribing may be associated with a state which indicates whether the adding, enrolling, and/or subscribing was a success. For example, the states may include one of completed (e.g., added), failed, or pending.

At step 619, user interface engine 524b of resource management server 520 may update dropdown interface element 821 to provide an indication of the adding, enrolling, and/or subscribing of the first selected entity. In some instances, the updating of dropdown interface element 821 may include replicating the state of the adding, enrolling, and/or subscribing of the first selected entity to the one or more domains. For example, the state replication may include providing an indication of the state of the adding, enrolling, and/or subscribing such as completed, failed, or pending. At step 620, user interface engine 524b of resource management server 520 may update table display user interface element 830 to include an indication of the adding, enrolling, and/or subscribing of the first selected entity.

Figure 8D:
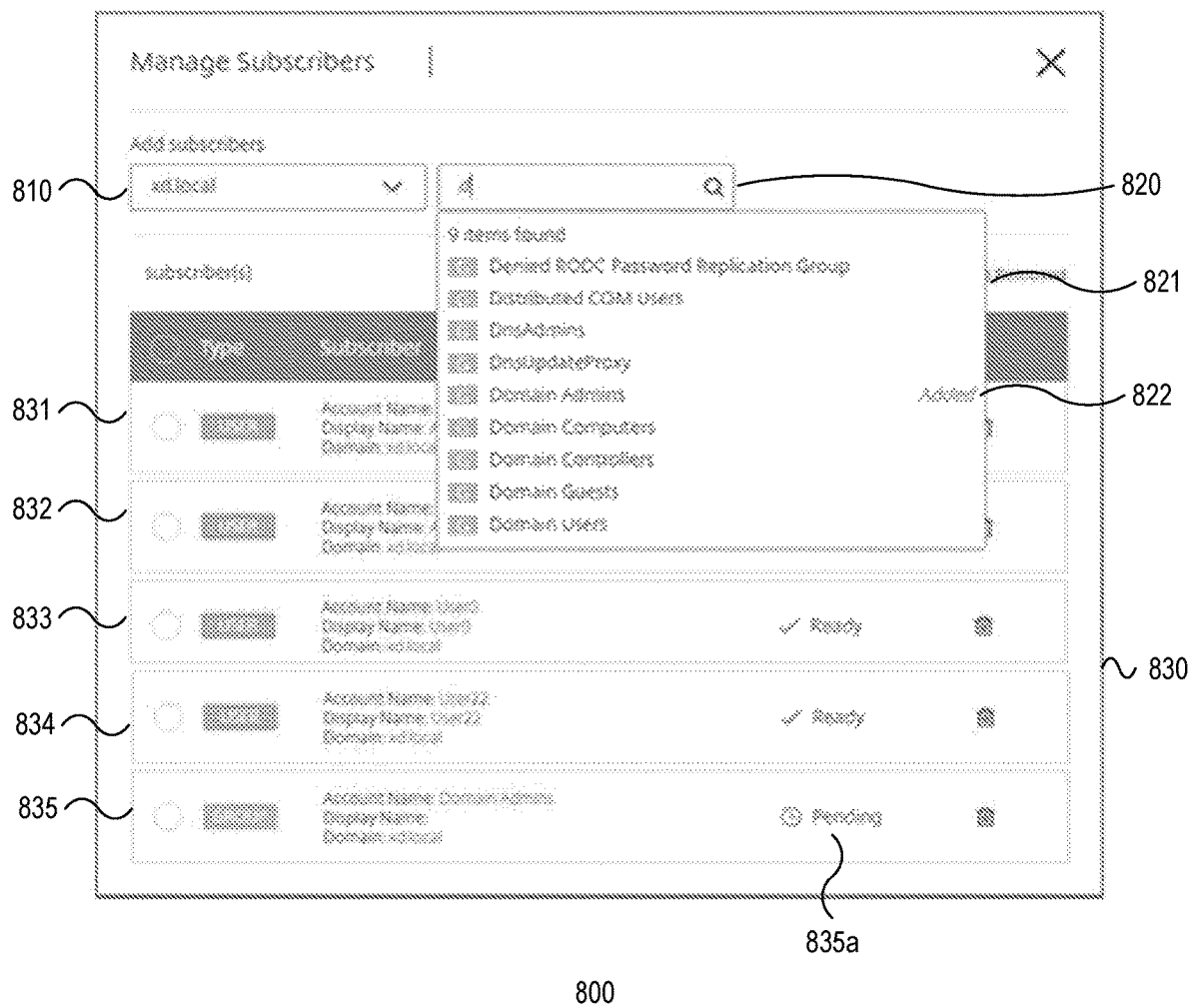

For example, in reference to FIG. 8D, user interface engine 524b may update dropdown interface element 821 to include adding, enrolling, and/or subscribing indication 822 corresponding to the first selected entity. Further, user interface engine 524b may update table display user interface element 830 to include the added, enrolled, and/or subscribed entity 835, as well as state 835a of entity 835 (e.g., first selected entity).

Figure 6F:
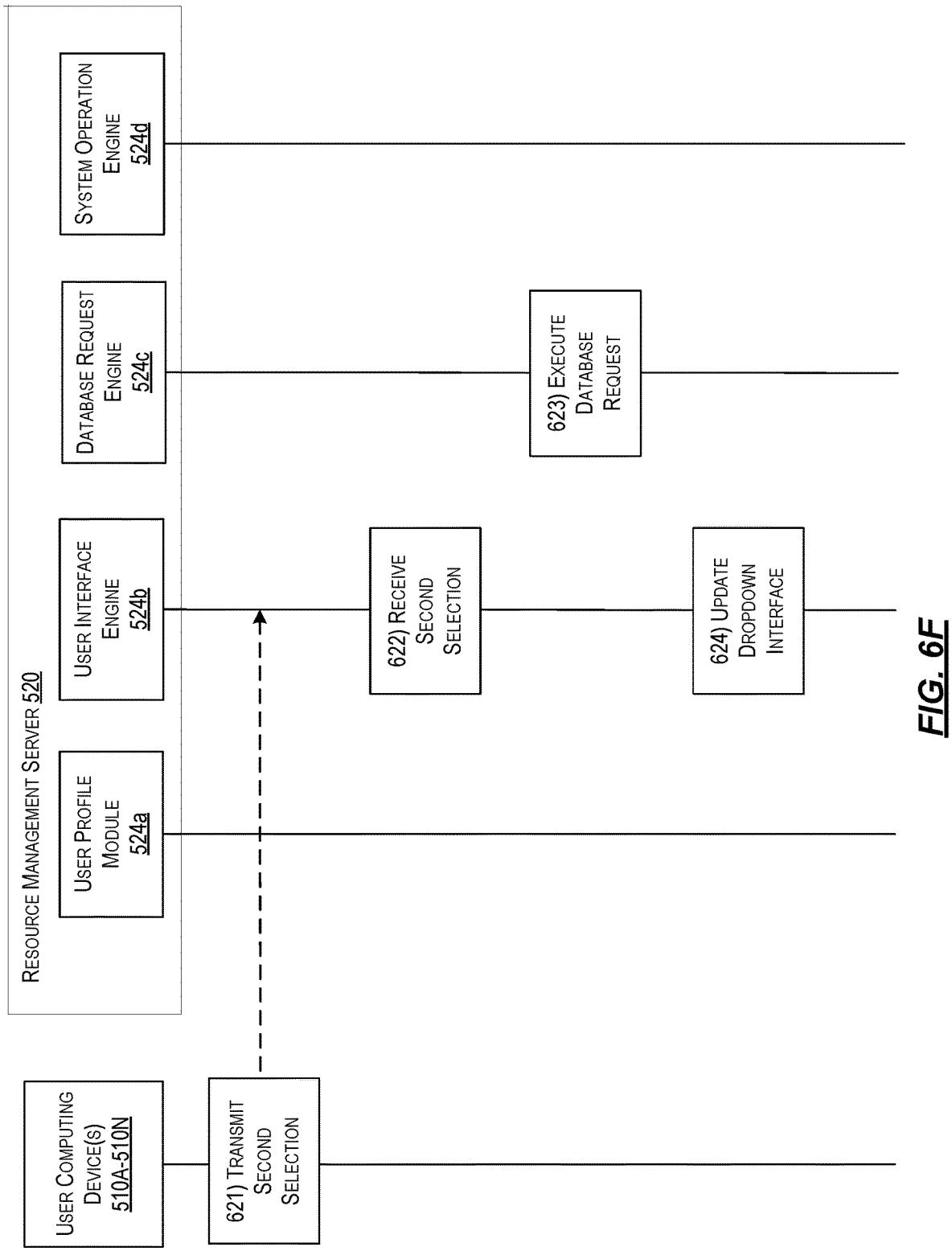

Referring to FIG. 6F, at step 621, a user and/or system administrator of one of user computing devices 510A-510N may transmit a second selection of one of the results (e.g., entities) yielded during the database request performed at step 614 and populated in dropdown interface element 821 at step 615. At step 622, user interface engine 524b of resource management server 520 may receive the second selection, by the user and/or system administrator and from the computing device of user computing devices 510A-510Na, of one of the results yielded during the database request. At step 623, database request engine 524c may add, enroll, and/or subscribe the entity corresponding to the second selection to each of the one or more domains selected by the user at step 608. In some instances, the adding, enrolling, and/or subscribing of the first entity to each of the one or more domains may include executing a database request, by database request engine 523c, of one or more of the database(s) 523. Further, the adding, enrolling, and/or subscribing may be associated with a state which indicates whether the adding, enrolling, and/or subscribing was a success. For example, the states may include one of completed (e.g., added), failed, or pending.

At step 624, user interface engine 524b of resource management server 520 may update dropdown interface element 821 to provide an indication of the adding, enrolling, and/or subscribing of the first selected entity. In some instances, the updating of dropdown interface element 821 may include replicating the state of the adding, enrolling, and/or subscribing of the first selected entity to the one or more domains. For example, the state replication may include providing an indication of the state of the adding, enrolling, and/or subscribing such as completed, failed, or pending.

Figure 6G:
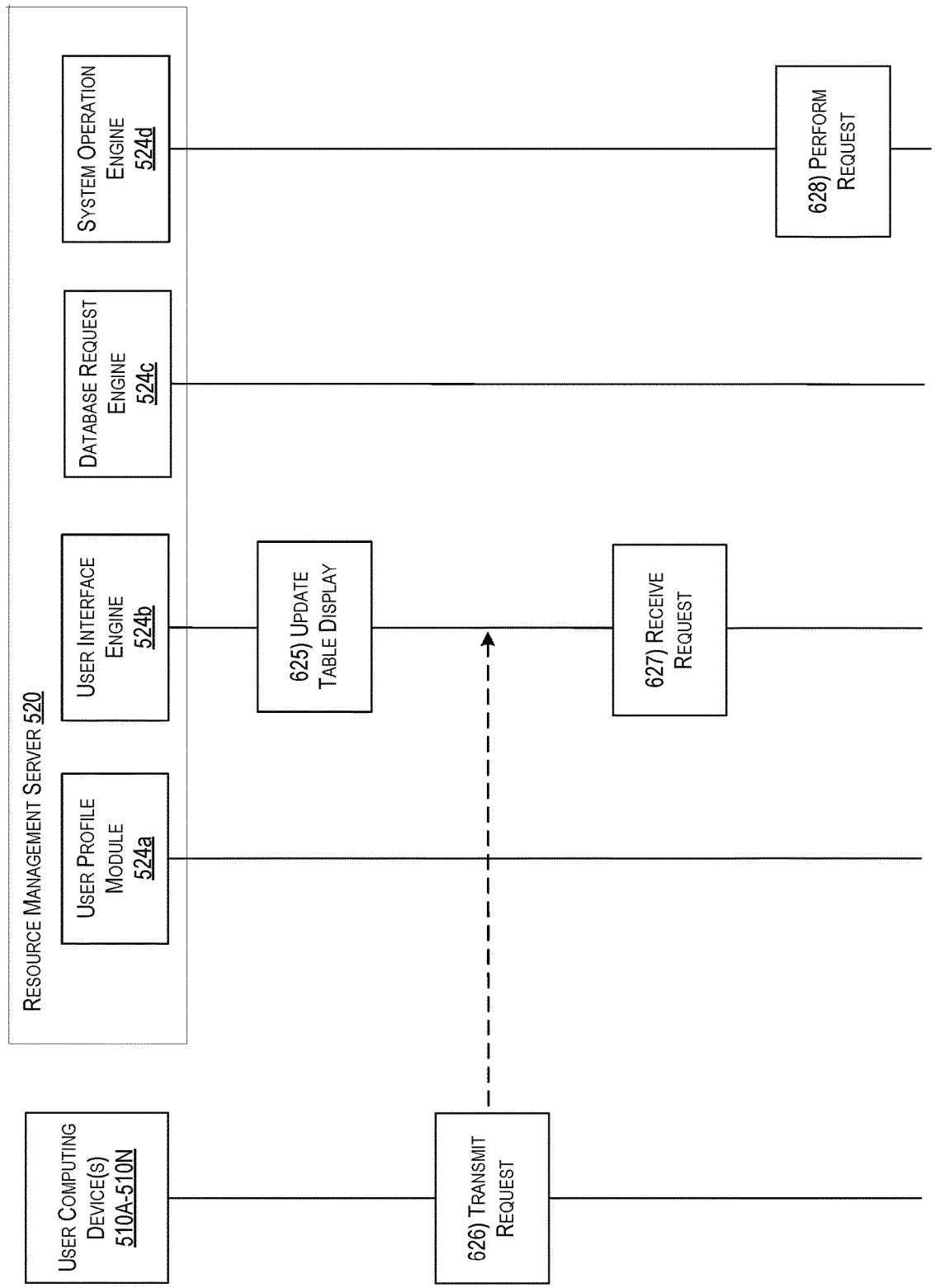
Figure 8E:
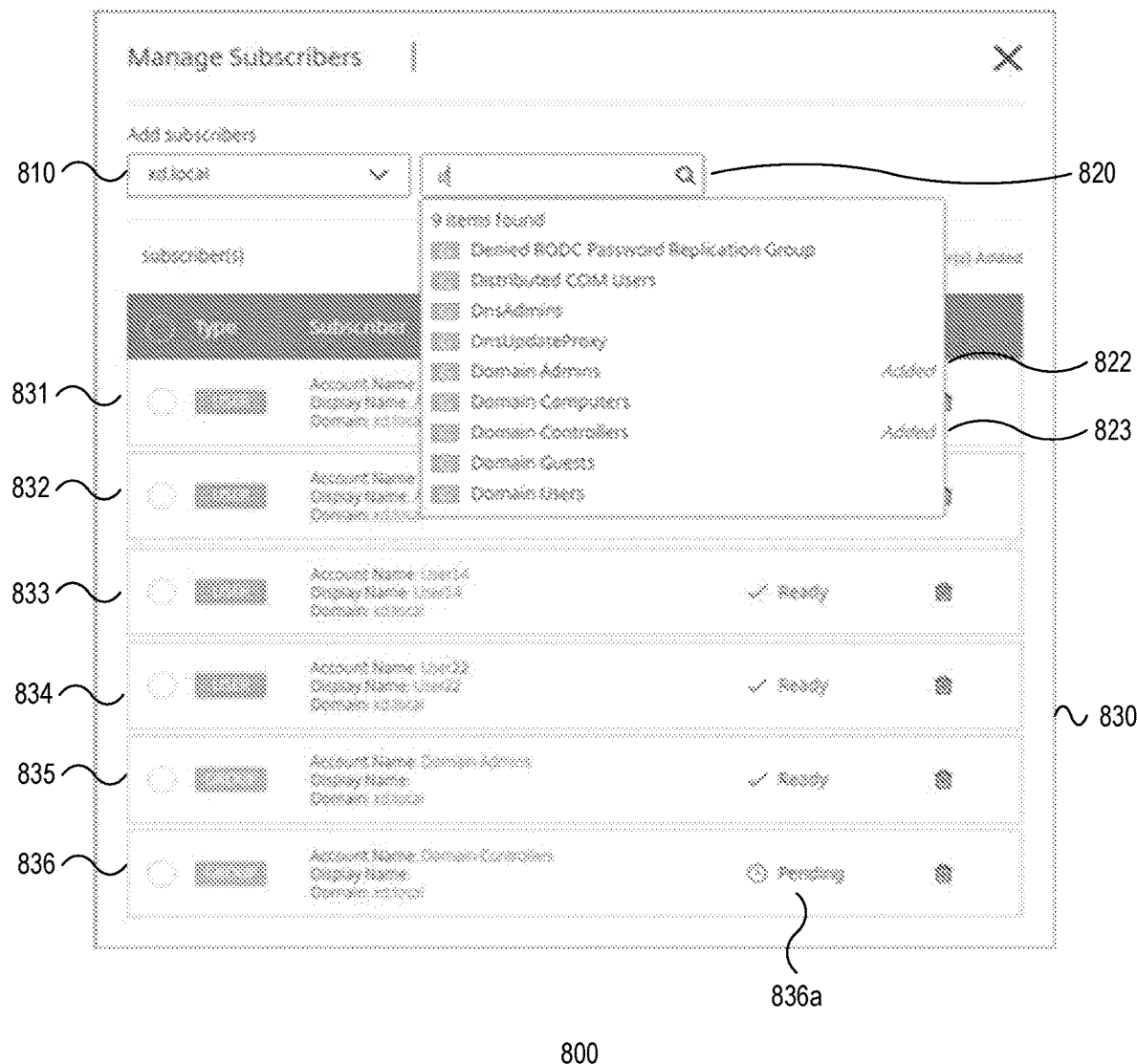

Referring to FIG. 6G, at step 625, user interface engine 524b of resource management server 520 may update table display user interface element 830 to include an indication of the adding, enrolling, and/or subscribing of the second selected entity. For example, in reference to FIG. 8E, user interface engine 524b may update dropdown interface element 821 to include adding, enrolling, and/or subscribing indication 823 corresponding to the second selected entity. Further, user interface engine 524b may update table display user interface element 830 to include the added, enrolled, and/or subscribed entity 836 (e.g., second selected entity), as well as state 836a of entity 836. While only a first selection and second selection are described above in steps 616-625, it should be understood that similar processes as described in steps 616-625 may be performed for a third selection, fourth selection, and so on.

By allowing a user and/or system administrator to dynamically add one or more entities to one or more domains through the multi-select dropdown state replication user interface element 820, technological benefits may be provided such as improving computing efficiency, reducing energy usage in performing computational processes associated with the adding of users to the one or more domains, and minimizing bandwidth consumption resulting from interactions during the adding of users to the one or more domains by streamlining the entry, presentation, and flow of data from a computing device of one of user computing devices 510A-510N associated with the user and/or system administrator to the resource management server 520.

At step 626, the user, system administrator, other user, and/or group of users may transmit a request to resource management server 520 through user interface engine 524b. In some instances, the user, system administrator, other user, and/or group of users may have been added to one or more new domains in the process described in steps 601-625 and the request may correspond to permissions and/or subscription categories of at least one of the one or more new domains. At step 627, user interface engine 524b of resource management server 520 may receive the request from the computing device of user computing devices 510A-510N.

At step 628, system operation engine 524d of resource management server 520 may perform the request provided by the user, system administrator, other user, and/or group of users at step 626. In some instances, system operation engine 524d may cause resource management server 520 to enable one or more of user computing devices 510A-510N to access particular files, data, and/or applications, transmit messages to particular entities, access particular networks, and the like.

Figure 7:
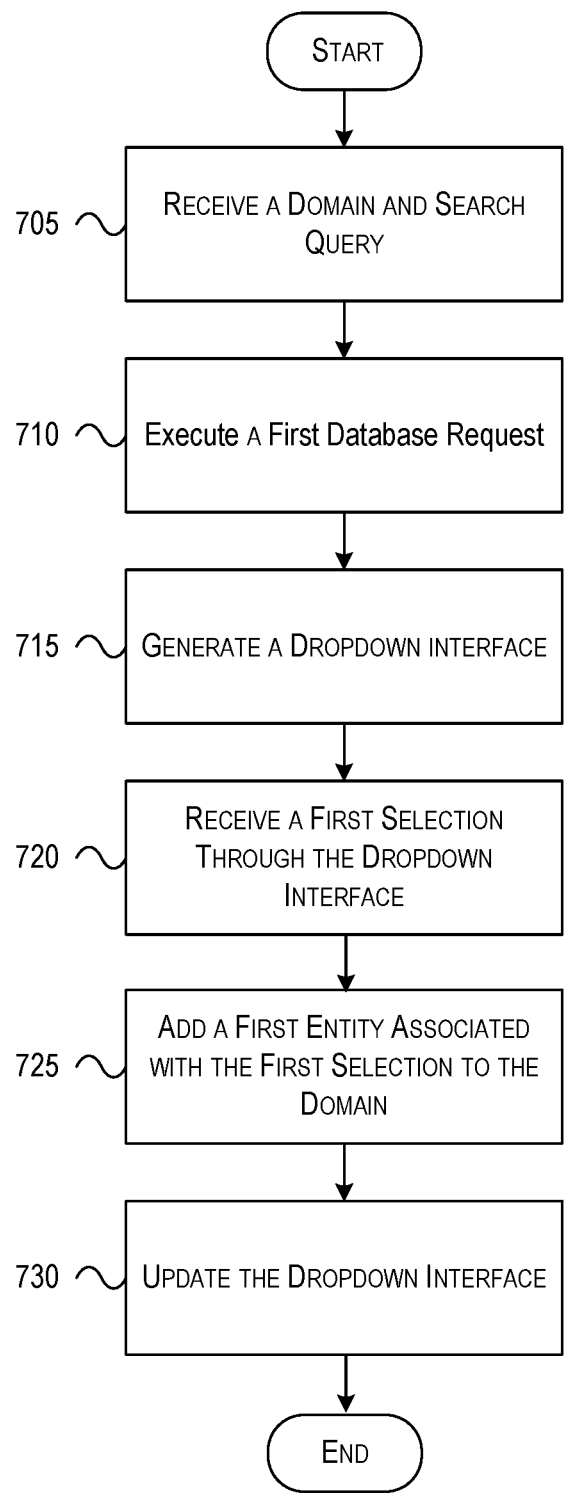
FIG. 7 depicts an illustrative method for performing multi-select dropdown state replication in accordance with one or more illustrative aspects described herein.

FIG. 7 depicts an illustrative method for performing multi-select dropdown state replication in accordance with one or more illustrative aspects described herein. Referring to FIG. 7, at step 705, a first computing device may receive a domain and search query from a second computing device through a user interface associated with the first computing device. At step 710, the first computing device may execute a first database request based on the search query. At step 715, the first computing device may generate a dropdown interface in the user interface, the dropdown interface containing one or more results of the search query. At step 720, the first computing device may receive a first selection, from the second computing device, of one of the one or more results of the search query. At step 725, the first computing device may add a first entity associated with the first selection of the one of the one or more results of the search query to the domain. At step 730, the first computing device may update the dropdown interface in the user interface containing the one or more results of the search query with an indication of the adding of the first entity.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
   receiving, through a user interface associated with a first computing device and from a second computing device, a domain and search query, the user interface including a data table of previously added entities to the domain;
   executing, by the first computing device, a first database request based on the search query;
   generating, by the first computing device, a dropdown interface in the user interface containing one or more results of the search query;
   receiving, by the first computing device, a first selection of one of the one or more results of the search query from the second computing device;
   dynamically adding, by the first computing device and to the domain, a first entity associated with the first selection of the one of the one or more results of the search query; and
   updating, by the first computing device, the user interface in response to addition of the first entity to the domain, the update including an indication within the dropdown interface of the addition of the first entity and a status of the first entity in the data table.

2. The method of claim 1, further comprising:
   receiving, by the first computing device and from the second computing device, a second selection of another of the one or more results of the search query;
   dynamically adding, by the first computing device and to the domain, a second entity associated with the second selection of the another of the one or more results of the search query; and
   updating, by the first computing device, the dropdown interface in the user interface containing the one or more results of the search query with an indication of the adding of the second entity.

3. The method of claim 1, wherein the adding the first entity further comprises:
   responsive to receiving the first selection, executing, by the first computing device, a second database request, wherein the second database request adds the first entity associated with the first selection of the one of the one or more results of the search query to the domain.

4. The method of claim 1, wherein the search query identifies one or more entities able to be added to the domain.

5. The method of claim 4, wherein being added to the domain enables the one or more entities to perform one or more functions associated with the domain.

6. A computing device comprising:
   at least one processor;
   memory storing computer-readable instructions that, when executed by the at least one processor, cause the computing device to:
   receive, from a remote computing device through a user interface associated with the computing device, domain and a search query, the user interface including a data table of previously added entities to the domain;
   execute a first database request based on the search query;
   generate a dropdown interface in the user interface containing one or more results of the search query;
   receive, from the remote computing device, a first selection of one of the one or more results of the search query;
   dynamically add, to the domain, a first entity associated with the first selection of the one of the one or more results of the search query; and
   update the user interface in response to addition of the first entity to the domain, the update including an indication within the dropdown interface of the addition of the first entity and a status of the first entity in the data table.

7. The computing device of claim 6, wherein the memory stores further computer-readable instructions that, when executed by the at least one processor, cause the computing device to:
- receive, from the remote computing device, a second selection of another of the one or more results of the search query;
- dynamically add, to the domain, a second entity associated with the second selection of the another of the one or more results of the search query; and
- update the dropdown interface in the user interface containing the one or more results of the search query with an indication of the adding of the second entity.

8. The computing device of claim 6, wherein the memory stores further computer-readable instructions that, when executed by the at least one processor, cause the computing device to:
- responsive to receiving the first selection, execute a second database request, wherein the second database request adds the first entity associated with the first selection of the one of the one or more results of the search query to the domain.

9. The computing device of claim 6, wherein the search query identifies one or more entities able to be added to the domain.

10. The computing device of claim 9, wherein being added to the domain enables the one or more entities to perform one or more functions associated with the domain.

11. One or more non-transitory computer-readable media storing instructions that, when executed by a computing device comprising at least one processor and memory, cause the computing device to:
- receive, from a remote computing device through a user interface associated with the computing device, domain and a search query, the user interface including a data table of previously added entities to the domain;
- execute a first database request based on the search query;
- generate a dropdown interface in the user interface containing one or more results of the search query;
- receive, from the remote computing device, a first selection of one of the one or more results of the search query;
- dynamically add, to the domain, a first entity associated with the first selection of the one of the one or more results of the search query; and
- update the user interface in response to addition of the first entity to the domain, the update including an indication within the dropdown interface of the addition of the first entity and a status of the first entity in the data table.

12. The one or more non-transitory computer-readable media of claim 11, storing further instructions that, when executed by the at least one processor and memory, cause the computing device to: receive, from the user computing device, a second selection of another of the one or more results of the search query;
- dynamically add, to the domain, a second entity associated with the second selection of the another of the one or more results of the search query; and
- update the dropdown interface in the user interface containing the one or more results of the search query with an indication of the adding of the second entity.

13. The one or more non-transitory computer-readable media of claim 11, storing further instructions that, when executed by the at least one processor and memory, cause the computing device to:
- responsive to receiving the first selection, execute a second database request, wherein the second database request adds the first entity associated with the first selection of the one of the one or more results of the search query to the domain.

14. The one or more non-transitory computer-readable media of claim 11, wherein the search query identifies one or more entities able to be added to the domain, and wherein being added to the domain enables the one or more entities to perform one or more functions associated with the domain.

* * * * *